US012390700B1

(12) United States Patent
DeMille et al.

(10) Patent No.: US 12,390,700 B1
(45) Date of Patent: Aug. 19, 2025

(54) ADDITIVE MANUFACTURED GOLF CLUB FACE INSERT

(71) Applicant: Topgolf Callaway Brands Corp., Carlsbad, CA (US)

(72) Inventors: Brandon DeMille, Carlsbad, CA (US); Patrick Dawson, Poway, CA (US)

(73) Assignee: Topgolf Callaway Brands Corp., Carlsbad, CA (US)

( * ) Notice: Subject to any disclaimer, the term of this patent is extended or adjusted under 35 U.S.C. 154(b) by 295 days.

(21) Appl. No.: 18/208,760

(22) Filed: Jun. 12, 2023

Related U.S. Application Data

(63) Continuation-in-part of application No. 18/122,589, filed on Mar. 16, 2023, now Pat. No. 12,036,450, which is a continuation of application No. 17/327,428, filed on May 21, 2021, now Pat. No. 11,607,735.

(60) Provisional application No. 63/353,796, filed on Jun. 20, 2022, provisional application No. 63/166,028, filed on Mar. 25, 2021.

(51) Int. Cl.
| | | |
|---|---|---|
| *A63B 53/04* | (2015.01) |
| *B22F 3/10* | (2006.01) |
| *B22F 10/14* | (2021.01) |
| *B22F 10/68* | (2021.01) |
| *B22F 10/80* | (2021.01) |
| *B29C 64/165* | (2017.01) |
| *B29C 64/386* | (2017.01) |
| *B33Y 10/00* | (2015.01) |
| *B33Y 40/20* | (2020.01) |
| *B33Y 50/00* | (2015.01) |
| *G06F 30/10* | (2020.01) |
| *A63B 102/32* | (2015.01) |
| *B33Y 80/00* | (2015.01) |
| *G06F 113/10* | (2020.01) |
| *G06F 119/18* | (2020.01) |

(52) U.S. Cl.
CPC ........ *A63B 53/045* (2020.08); *A63B 53/0416* (2020.08); *A63B 53/0433* (2020.08); *A63B 53/0437* (2020.08); *B22F 3/1021* (2013.01); *B22F 10/14* (2021.01); *B22F 10/68* (2021.01); *B22F 10/80* (2021.01); *B29C 64/165* (2017.08); *B29C 64/386* (2017.08); *B33Y 10/00* (2014.12); *B33Y 40/20* (2020.01); *B33Y 50/00* (2014.12); *G06F 30/10* (2020.01); *A63B 53/0458* (2020.08); *A63B 53/0466* (2013.01); *A63B 53/047* (2013.01); *A63B 53/0475* (2013.01); *A63B 53/0487* (2013.01); *A63B 2102/32* (2015.10); *A63B 2209/00* (2013.01); *B33Y 80/00* (2014.12); *G06F 2113/10* (2020.01); *G06F 2119/18* (2020.01)

(58) Field of Classification Search
None
See application file for complete search history.

(56) References Cited

U.S. PATENT DOCUMENTS

| | | | |
|---|---|---|---|
| 2014/0274458 A1* | 9/2014 | Kronenberg | A63B 60/46 700/106 |
| 2020/0298077 A1* | 9/2020 | Clarke | A63B 53/042 |

* cited by examiner

*Primary Examiner* — Daniel J. Schleis
(74) *Attorney, Agent, or Firm* — Michael A. Catania

(57) ABSTRACT

A resilient, high-performance face insert for a golf club head, preferably a putter head, is disclosed herein. In particular, the face insert comprises multiple layers of material, one or more of which may be manufactured using additive printing processes, and one or more of which may comprise variable thickness patterns to optimize ball speed, spin, and other performance characteristics.

14 Claims, 7 Drawing Sheets

ADDITIVE MANUFACTURED GOLF CLUB FACE INSERT

CROSS REFERENCES TO RELATED APPLICATIONS

The Present Application claims priority to U.S. Provisional Patent Application No. 63/353,796, filed on Jun. 20, 2022, and the Present Application is a continuation-in-part application of U.S. patent application Ser. No. 18/122,589, filed on Mar. 16, 2023, which is a continuation application of U.S. patent application Ser. No. 17/327,428, filed May 21, 2021, now U.S. Pat. No. 11,607,735, issued on Mar. 21, 2023, which claims priority to U.S. Provisional Application No. 63/166,028, filed on Mar. 25, 2021, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention relates to a multiple material golf club face insert that can be at least partially manufactured using additive manufacturing techniques.

Description of the Related Art

The prior art discloses many different types of face inserts for golf club heads, including putters, that are intended to improve face performance. There is, however, still a need for a putter face that optimizes performance and increases the consistency of ball speed across the face and that can be efficiently created using additive manufacturing techniques.

BRIEF SUMMARY OF THE INVENTION

One aspect of the present invention is a golf club face insert comprising multiple materials, including layers of urethane and metal, in lattice or solid form, one or more of which may be manufactured using additive manufacturing techniques.

Another aspect of the present invention is a golf club face insert comprising a first layer and a second layer disposed behind and permanently affixed to the first layer, wherein at least one of the first layer and the second layer has a variable thickness. In some embodiments, first layer may have a constant thickness and the second layer may have a variable thickness pattern. In an alternative embodiment, the first layer may have a first variable thickness pattern, the second layer may have a second variable thickness pattern, and the first variable thickness pattern may complement the second variable thickness pattern so that, when the first variable thickness pattern is engaged with the second variable thickness pattern, the face insert may have a constant thickness. In a further embodiment, the second layer may comprise a lattice structure, which may be manufactured via an additive printing process.

In another embodiment, at least one of the first layer and the second layer may comprise a lattice structure, and in a further embodiment, each of the first layer and the second layer may comprise a lattice structure. In a further embodiment, at least one of the first layer and the second layer may be manufactured via an additive manufacturing process, and in a further embodiment, each of the first layer and the second layer may be manufactured via an additive manufacturing process. In another embodiment, the golf club face insert may further comprise an adhesive layer permanently affixed to a rear surface of the second layer.

In any of the embodiments, the first layer may comprise at least one shell and structure selected from the group consisting of lattice or gyroid/TPMS, the at least one shell may at least partially cover the structure, and the lattice structure may protrude from the at least one shell so that the lattice structure is partially exposed. In a further embodiment, the first layer may comprise at least one drain hole, which may be covered by the at least one shell. In any embodiment, the first layer may be composed of a urethane material, and the second layer may comprise a metal material. In any embodiment, each of the first layer and the second layer may be composed of a urethane material. In any embodiment, at least one of the first layer and the second layer may be composed of a material selected from the group consisting of transparent and translucent.

Another aspect of the present invention is a golf club face insert comprising a structure selected from the group consisting of a lattice and a gyroid/TPMS and at least one filler material. In some embodiments, the at least one filler material may be selected from the group consisting of a translucent material and a transparent material. In a further embodiment, the structure may comprise at least one opaque material, which may be selected from the group consisting of urethane, titanium alloy, and steel. In some embodiments, the structure may be a lattice comprising beams and cells, and a beam size and a cell size may vary throughout the face insert. In other embodiments, the structure may comprise at least one material selected from the group consisting of transparent and translucent. In any embodiment, the structure may be manufactured via an additive manufacturing process.

Yet another aspect of the present invention is a golf club face insert comprising a structure selected from the group consisting of a lattice and a gyroid/TPMS, and at least one shell, wherein the at least one shell at least partially covers the structure. In some embodiments, the structure may comprise at least one drain hole, which may be covered by the at least one shell. In other embodiments, the structure may be composed of at least one material selected from the group consisting of transparent and translucent. In a further embodiment, the at least one material may be a urethane. In any embodiment, the structure may be a lattice comprising beams and cells, and a beam size and a cell size may vary throughout the face insert. In any embodiment, the structure may be manufactured via an additive manufacturing process.

Having briefly described the present invention, the above and further objects, features, and advantages thereof will be recognized by those skilled in the pertinent art from the following detailed description of the invention when taken in conjunction with the accompanying drawings.

DETAILED DESCRIPTION OF THE INVENTION

Each embodiment of the present invention is directed to a face insert 100 for a golf club head 10, preferably a putter head. An exemplary putter head 10 that would benefit from any of the embodiments of the face insert 100 of the present invention is shown in FIG. 1.

Figure 1:
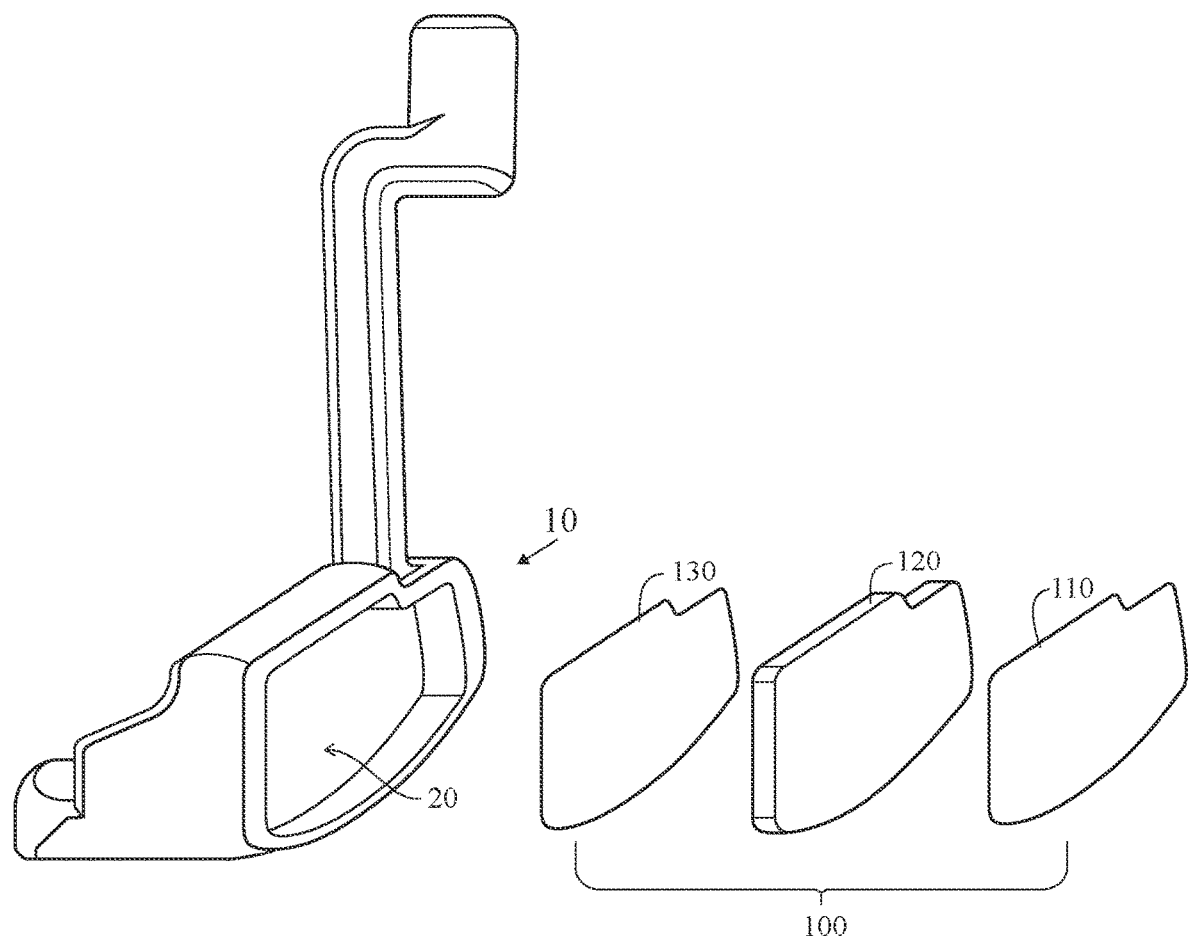
FIG. 1 is an exploded view of an exemplary golf club head with an embodiment of the face insert of the present invention.

In one embodiment, the face insert 100 has at least first and second layers 110, 120; as shown in FIG. 1, a third layer 130 may be added, and may constitute an adhesive to bond the face insert 100 within a recess 20 in the golf club head 10, though it is not required.

Figure 2:
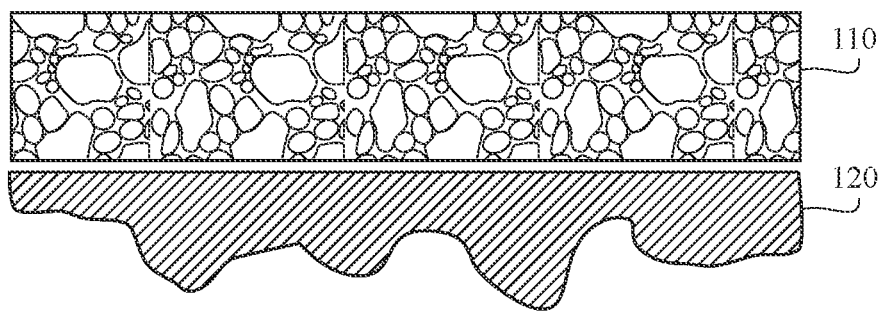
FIG. 2 is a cross-section of another embodiment of a face insert of the present invention.

In another embodiment, shown in FIG. 2, the first layer 110 is a urethane material, and the second layer 120 is a metal plate comprising variable thickness designed to control spin and ball speed.

Figure 3:
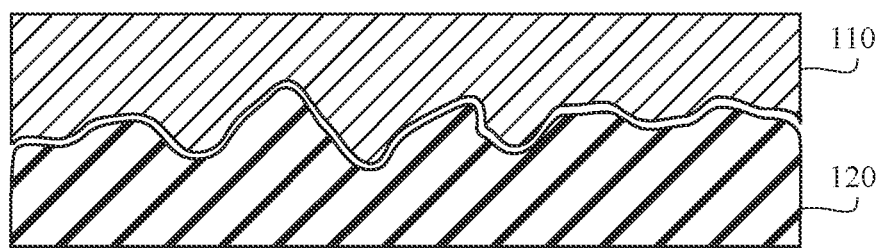
FIG. 3 is a cross-section of another embodiment of a face insert of the present invention.

In another embodiment, shown in FIG. 3, each of the first and second layer 110, 120 has a variable thickness that compliments the thickness of the other layer 110, 120, and may be composed of any suitable material selected by the manufacturer.

Figure 4:
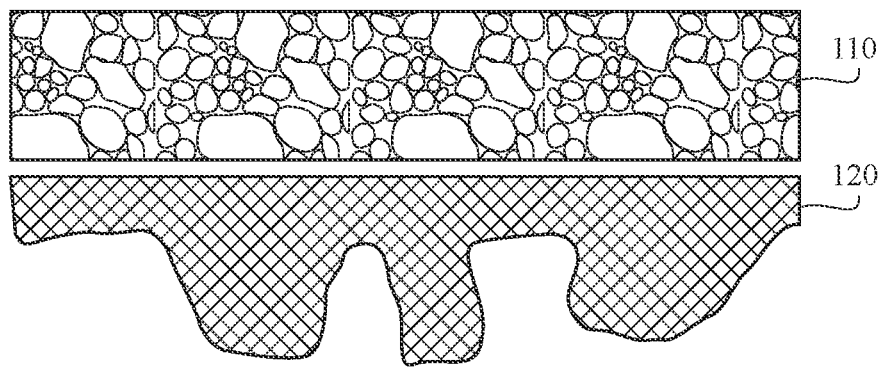
FIG. 4 is a cross-section of another embodiment of a face insert of the present invention.
Figure 5:
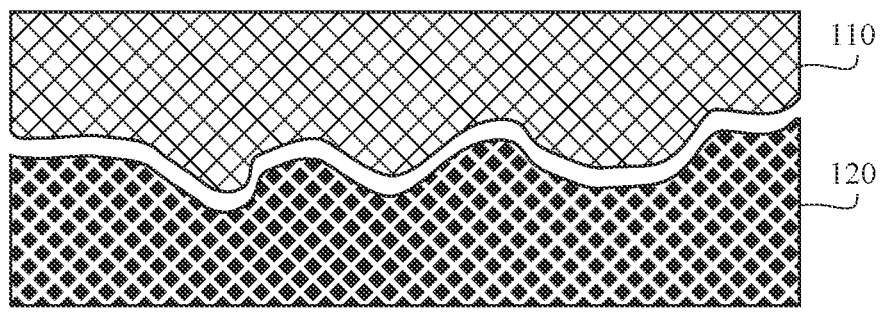
FIG. 5 is a cross-section of another embodiment of a face insert of the present invention.

In another embodiment, shown in FIG. 4, the first layer 110 is composed of any suitable striking material, such as urethane, while the second layer 120 comprises a lattice beam structure that may be manufactured using an additive manufacturing process. In another embodiment, shown in FIG. 5, each of the first and second layers 110, 120 comprise lattice beam structures, with complimentary variable thickness patterns.

In another embodiment, each layer 110, 120 is composed of urethane, each with varying thickness and varying mechanical properties.

In another embodiment, the face insert 100 comprises a lattice network of varying density and made of any material known to a person skilled in the art. The lattice network may be selected from the embodiments disclosed in U.S. patent application Ser. No. 17/362,638, filed on Jun. 29, 2021, the disclosure of which is hereby incorporated by reference in its entirety herein. Each lattice component may be composed of translucent or transparent material, and the lattice network may be filled with opaque or translucent or transparent filler material. The lattice network can have varying cell size and density to create variations in stiffness across the face insert 100, which can be used to change ball speed and other launch conditions to compensate for off-center hits. The lattice network may be disposed at the front, striking portion of the face insert 100 (e.g., be the first layer 110), but may be more effective when used as a backing (e.g., the second layer 120) for a solid first layer 110.

Figure 6:
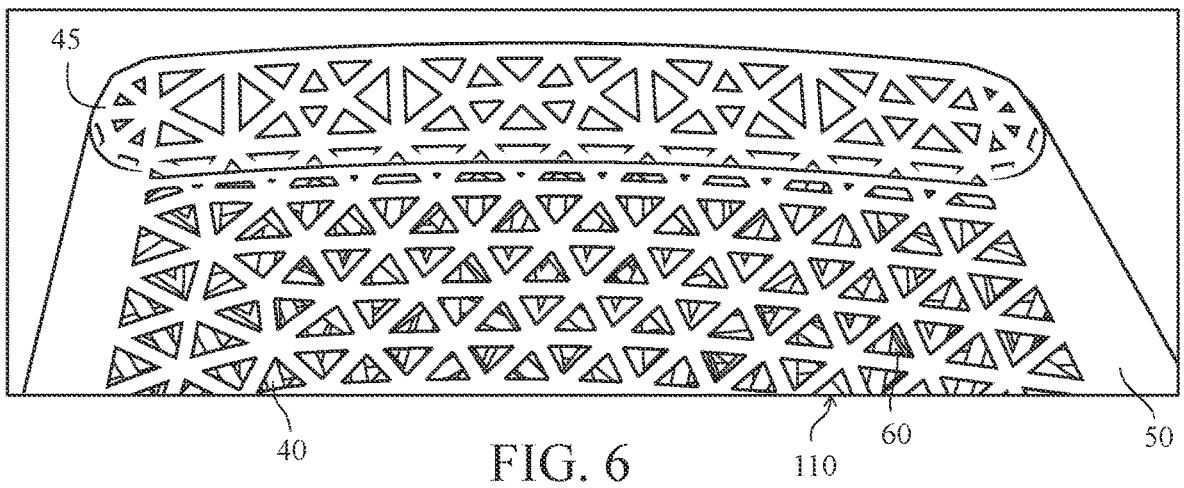
FIG. 6 is a side perspective view of another embodiment of a face insert of the present invention.

In any embodiment, the layer(s) 110, 120 may have lattice or gyroid/TPMS structures 40 inside one or more enclosing shells 50 that only partially enclose the structures 40, as shown in FIG. 6. For photocuring liquid-based additive manufacturing processes, a fully enclosed shell traps uncured liquid resin inside the part, so drain holes 60 are included to allow for resin to drain. These holes 60 may be covered up during assembly of the golf club head 10 with other components.

As shown in FIG. 6, the lattice or gyroid/TPMS structure 40 may protrude through the enclosing shell 50, allowing a golfer to see the technology inside of the insert 100. The enclosing shell 50 prevents debris from entering the golf club head 10 or layer 110, 120, but may be offset from the structure 40 so as to create the protrusion 45 and make the structure 40 more visible. The position of the enclosing shell 50 relative to the exterior of the structure 40 can also vary throughout the part, adjusted to account for structural support, acoustics, or cosmetics.

Though each of the face insert 100 embodiments disclosed herein are described in connection with a putter head 10, these embodiments may be used with any other golf club head, including drivers, fairway woods, irons, wedges, and hybrids.

Figure 7:
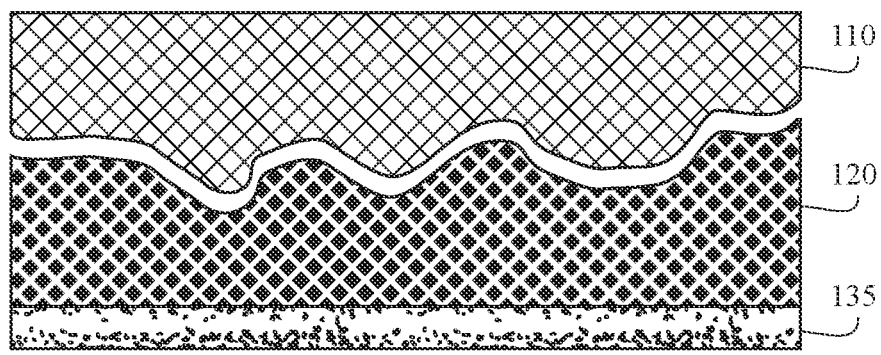
FIG. 7 is a cross-section of an alternative embodiment of a face insert of the present invention.

FIG. 7 illustrates a cross-section of an alternative embodiment of a face insert with an adhesive layer 135 permanently affixed to a rear surface of the second layer 120 adjacent a first layer 110.

Figure 8:
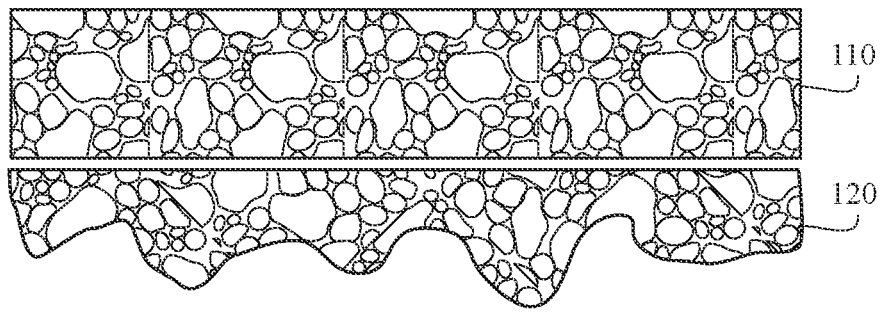
FIG. 8 is a cross-section of an alternative embodiment of a face insert of the present invention.

FIG. 8 is a cross-section of an alternative embodiment of a face insert with a first layer 110 and a second layer 110 composed of a urethane material. In one embodiment, the first layer 110 and the second layer 110 are composed of the same urethane material. In an alternative embodiment, the first layer 110 and the second layer 110 are each composed of a different urethane material.

Figure 9:
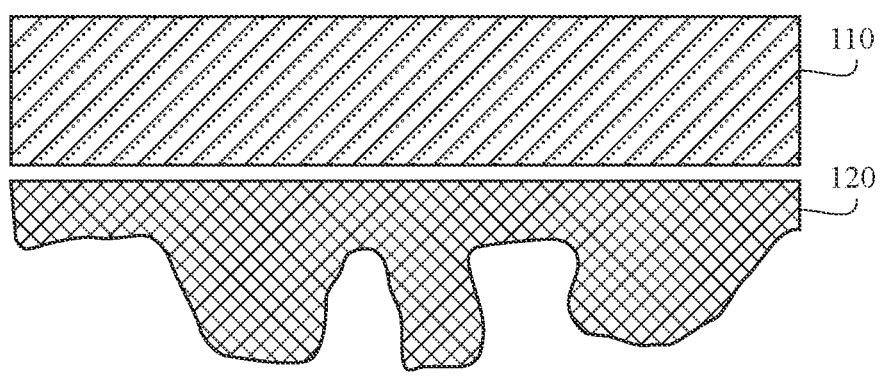
FIG. 9 is a cross-section of an alternative embodiment of a face insert of the present invention.

FIG. 9 is a cross-section of an alternative embodiment of a face insert with the first layer 110 and the second layer 120 composed of a transparent material and/or a translucent material. Alternatively, the first layer 110 is composed of a filler material and the second layer 120 is a lattice and a gyroid/TPMS. The filler material may by a transparent material and/or a translucent material.

The face insert alternatively comprises at least one opaque material, preferably selected from urethane, titanium alloy, or steel.

Figure 10:
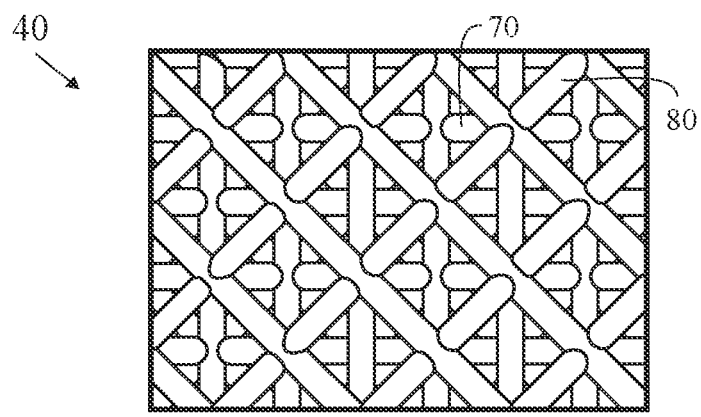
FIG. 10 is an isolated view of an alternative embodiment of a face insert of the present invention.

FIG. 10 is an isolated view of an alternative embodiment of a face insert wherein the structure 40 is a lattice comprising beams 80 and cells 70, and wherein a beam size 80 and a cell size 70 varies throughout the face insert.

DeMille et al., U.S. Pat. No. 10,835,789 for Support Structures For Golf Club Head, is hereby incorporated by reference in its entirety.

DeMille et al., U.S. Pat. No. 11,331,544 for Support Binder Jet Printed Golf Club Components With Lattice Structures, is hereby incorporated by reference in its entirety.

DeMille et al., U.S. Pat. No. 11,484,757 for Support Structures For Golf Club Heads And Methods Of Manufacturing Improved Supports Structures, is hereby incorporated by reference in its entirety.

DeMille et al., U.S. Pat. No. 11,497,973 for Additive Manufacturing Methods For Golf Products, is hereby incorporated by reference in its entirety.

DeMille et al., U.S. Pat. No. 11,607,735 for Additive Manufacturing Methods For Golf Club Components, is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim:

1. A golf club face insert comprising:
    a first layer; and
    a second layer disposed behind and permanently affixed to the first layer, wherein at least one of the first layer and the second layer has a variable thickness;
    wherein at least one of the first layer and the second layer is manufactured via an additive manufacturing process;
    wherein the first layer comprises at least one shell and structure selected from the group consisting of lattice or gyroid/TPMS;
    wherein the at least one shell at least partially covers the structure; and
    wherein the lattice structure protrudes from the at least one shell so that the lattice structure is partially exposed.

2. The golf club face insert of claim 1, wherein the first layer has a constant thickness and wherein the second layer has a variable thickness pattern.

3. The golf club face insert of claim 1, wherein the first layer has a first variable thickness pattern, wherein the second layer has a second variable thickness pattern, and wherein the first variable thickness pattern complements the second variable thickness pattern so that, when the first variable thickness pattern is engaged with the second variable thickness pattern, the face insert has a constant thickness.

4. The golf club face insert of claim 2, wherein the second layer comprises a lattice structure.

5. The golf club face insert of claim 4, wherein the second layer is manufactured via an additive printing process.

6. The golf club face insert of claim 3, wherein at least one of the first layer and the second layer comprises a lattice structure.

7. The golf club face insert of claim 6, wherein each of the first layer and the second layer comprises a lattice structure.

8. The golf club face insert of claim 1, wherein each of the first layer and the second layer is manufactured via an additive manufacturing process.

9. The golf club face insert of claim 1, further comprising an adhesive layer permanently affixed to a rear surface of the second layer.

10. The golf club face insert of claim 1, wherein the first layer comprises at least one drain hole.

11. The golf club face insert of claim 10, wherein the at least one drain hole is covered by the at least one shell.

12. The golf club face insert of claim 1, wherein the first layer is composed of a urethane material, and wherein the second layer comprises a metal material.

13. The golf club face insert of claim 1, wherein each of the first layer and the second layer is composed of a urethane material.

14. The golf club face insert of claim 1, wherein at least one of the first layer and the second layer is composed of a material selected from the group consisting of transparent and translucent.

* * * * *